(12) United States Patent
Moreau et al.

(10) Patent No.: US 9,791,102 B2
(45) Date of Patent: Oct. 17, 2017

(54) LANYARD SLIDER WITH IMPLEMENT HOLDERS

(71) Applicant: Ty-Flot, Inc., Manchester, NH (US)

(72) Inventors: Darrell A. Moreau, Manchester, NH (US); Andre W. Moreau, Spring Hill, FL (US)

(73) Assignee: TY-FLOT

( * ) Notice: Subject to any disclaimer, the term of this patent is extended or adjusted under 35 U.S.C. 154(b) by 271 days.

(21) Appl. No.: 14/535,910

(22) Filed: Nov. 7, 2014

(65) Prior Publication Data
US 2016/0073745 A1 Mar. 17, 2016

Related U.S. Application Data

(63) Continuation-in-part of application No. 29/502,352, filed on Sep. 15, 2014, now Pat. No. Des. 730,986, and a continuation-in-part of application No. 29/502,346, filed on Sep. 15, 2014, now Pat. No. Des. 741,213.

(51) Int. Cl.
| | | |
|---|---|---|
| B43K 23/00 | (2006.01) | |
| A45F 5/00 | (2006.01) | |
| F16M 13/04 | (2006.01) | |
| A44C 11/00 | (2006.01) | |

(52) U.S. Cl.
CPC ........... *F16M 13/04* (2013.01); *A44C 11/005* (2013.01)

(58) Field of Classification Search
CPC ......... F16M 13/04; A44C 11/005; A44C 5/22; B43K 23/001; B43K 23/016; B43K 23/06; B43K 25/00; B43K 29/00; B43K 23/00; Y10T 24/1321; Y10T 24/1374; Y10T 24/1397; A45F 2005/006; F16G 11/103
See application file for complete search history.

(56) References Cited

U.S. PATENT DOCUMENTS

| | | | | |
|---|---|---|---|---|
| 268,407 | A * | 12/1882 | Hughes | A61B 17/132 24/115 H |
| 301,133 | A * | 7/1884 | Lilley et al. | A44C 1/00 24/12 |
| 327,759 | A * | 10/1885 | Boyle | A45F 5/00 15/227 |
| 556,209 | A * | 3/1896 | Quinn | A45F 5/02 24/10 R |
| 676,277 | A * | 6/1901 | Robertson | A45F 5/02 24/3.13 |

(Continued)

*Primary Examiner* — Robert J Sandy
*Assistant Examiner* — Jason W San

(57) ABSTRACT

A lanyard slider includes a plate-like slider body having a top surface, a bottom surface, a first side portion, and a second side portion. The plate-like slider body defines at least one cord opening extending longitudinally therethrough along a cord opening axis extending between the bottom surface and the top surface, where the cord opening is sized to receive a lanyard cord. The lanyard slider also has at least one implement holder that is contiguous with and extends from the slider body. Each implement holder has a first holder sidewall and a second holder sidewall extending in opposed and spaced apart relation, where the first holder sidewall and the second holder sidewall define therebetween an implement passageway extending along a holder passageway axis and having an elongated cross-sectional shape.

19 Claims, 10 Drawing Sheets

(56) References Cited

U.S. PATENT DOCUMENTS

| | | | | |
|---|---|---|---|---|
| 897,064 A * | 8/1908 | Crawford, Jr. | B43K 23/001 | 2/250 |
| 945,602 A * | 1/1910 | Raschick | B43K 23/001 | 24/10 R |
| 1,274,312 A * | 7/1918 | Nicoll | A45F 5/00 | 131/257 |
| 1,281,299 A * | 10/1918 | Crosson | A45C 11/34 | 224/673 |
| 1,455,879 A * | 5/1923 | Gronlund | B43K 23/001 | 24/115 H |
| 1,482,647 A * | 2/1924 | Gise | A45F 5/00 | 224/219 |
| 1,603,044 A * | 10/1926 | Gise | A44C 5/0046 | 15/224 |
| 1,620,930 A * | 3/1927 | Webb | B43K 25/024 | 24/3.1 |
| 1,677,767 A * | 7/1928 | Goodridge | B43K 23/002 | 24/116 A |
| 1,708,915 A * | 4/1929 | Deli | B43K 23/002 | 24/116 A |
| 2,219,596 A * | 10/1940 | Lundquist | B43K 31/00 | 211/69.8 |
| 2,285,000 A * | 6/1942 | Wallace | B43K 23/001 | 24/10 R |
| 2,544,618 A * | 3/1951 | Smith | A45C 11/18 | 150/145 |
| 2,609,578 A * | 9/1952 | Andary | A45C 13/02 | 132/318 |
| 2,641,809 A * | 6/1953 | Kimball | H04M 1/21 | 211/69.8 |
| 2,911,694 A * | 11/1959 | Seron | A41F 11/04 | 224/614 |
| 3,105,279 A * | 10/1963 | Westhoff | B42D 5/006 | 24/10 R |
| 3,178,784 A * | 4/1965 | Krauthamer | B43K 23/001 | 2/250 |
| 3,550,824 A * | 12/1970 | Bohanski | F21V 21/08 | 224/197 |
| 3,627,182 A * | 12/1971 | Calkins | B43K 23/001 | 224/183 |
| 4,176,773 A * | 12/1979 | Wilkinson | A45C 11/00 | 224/148.5 |
| 4,361,934 A * | 12/1982 | Darnell | A63B 71/0672 | 24/11 PP |
| 4,666,203 A * | 5/1987 | Castro | A45F 5/1026 | 24/10 R |
| 4,674,298 A * | 6/1987 | Wimmershoff-Caplan | A44C 15/003 | 224/251 |
| 4,852,221 A * | 8/1989 | Antonucci | B43K 23/001 | 24/10 R |
| 4,875,591 A * | 10/1989 | Mikesell | B43K 23/002 | 211/69.1 |
| 4,930,193 A * | 6/1990 | Baker | F16G 11/14 | 24/129 R |
| 4,986,683 A * | 1/1991 | Whitright | B43K 5/005 | 211/69.1 |
| 4,993,611 A * | 2/1991 | Longo | A45F 5/00 | 220/737 |
| 5,027,478 A * | 7/1991 | Suhr | B65H 75/36 | 137/355.16 |
| 5,054,636 A * | 10/1991 | Netzer | B65D 67/02 | 206/504 |
| 5,140,723 A * | 8/1992 | Genzel | B43K 23/001 | 24/10 R |
| 5,178,354 A | 1/1993 | Engvall | | |
| 5,259,095 A * | 11/1993 | Tam | A45F 5/00 | 24/10 R |
| 5,263,259 A * | 11/1993 | Cimador | B43K 23/06 | 33/41.4 |
| 5,289,961 A * | 3/1994 | Levitt | A45F 5/00 | 224/219 |
| 5,339,498 A * | 8/1994 | Parsons | B63B 21/08 | 24/115 M |
| 5,360,342 A * | 11/1994 | Pardner | B43K 23/001 | 401/88 |
| 5,437,399 A * | 8/1995 | Levitt | A45F 5/00 | 224/219 |
| 5,640,743 A * | 6/1997 | Greene | B42F 1/10 | 24/10 R |
| 5,718,023 A * | 2/1998 | Billish | A45F 5/02 | 224/219 |
| 5,749,504 A * | 5/1998 | Bieker | A45F 3/00 | 224/221 |
| 5,820,095 A * | 10/1998 | Stone | B43K 23/002 | 211/69.1 |
| 5,842,256 A * | 12/1998 | Anscher | A44B 99/00 | 24/170 |
| 5,881,434 A * | 3/1999 | Rigney | B43K 23/001 | 24/11 R |
| D414,210 S | 9/1999 | Davis | | |
| 5,988,575 A * | 11/1999 | Lesko | B65D 69/00 | 211/60.1 |
| 6,000,103 A * | 12/1999 | Paice | A45F 5/02 | 206/38 |
| 6,012,204 A * | 1/2000 | Roethler | B60P 7/0823 | 24/129 R |
| 6,094,783 A * | 8/2000 | Parsons | B60P 7/0823 | 114/218 |
| 6,145,717 A * | 11/2000 | Rebeck | A45F 5/14 | 224/242 |
| 6,318,921 B1 * | 11/2001 | Craine | B43K 23/02 | 401/131 |
| 6,394,677 B2 * | 5/2002 | Wang | B43K 23/02 | 224/183 |
| 6,409,404 B1 * | 6/2002 | Piech | B43K 5/005 | 206/371 |
| 6,435,749 B1 * | 8/2002 | Lecce | B43K 23/12 | 24/10 R |
| 6,688,507 B2 * | 2/2004 | McCormack | A44C 25/00 | 224/247 |
| 6,752,305 B2 * | 6/2004 | Shattuck | A45C 11/182 | 150/145 |
| 6,769,270 B2 * | 8/2004 | Takessian | A44C 25/00 | 24/3.4 |
| 6,830,402 B2 * | 12/2004 | Sunatori | B43K 23/001 | 401/100 |
| 6,848,207 B1 * | 2/2005 | Powell | G09F 3/207 | 224/257 |
| 6,851,591 B2 * | 2/2005 | Wissman | A45F 5/02 | 224/245 |
| 6,871,767 B2 * | 3/2005 | Perlman | B43K 23/04 | 206/214 |
| 7,070,047 B2 * | 7/2006 | Jannoun | A45C 3/02 | 206/232 |
| D528,163 S * | 9/2006 | Mandel | D11/79 | |
| 7,125,186 B1 * | 10/2006 | Stokes | B43K 7/005 | 401/195 |
| 7,137,151 B2 * | 11/2006 | Keech | A42B 1/24 | 2/209.13 |
| 7,144,254 B2 * | 12/2006 | Meyerrose | B43K 23/001 | 24/10 R |
| 7,296,889 B2 * | 11/2007 | Dietz | A45F 5/02 | 24/3.3 |
| 7,377,708 B2 * | 5/2008 | Hageman | B43K 23/008 | 401/131 |
| 7,563,047 B2 * | 7/2009 | Paluda | B43K 23/001 | 401/131 |
| 7,571,805 B2 * | 8/2009 | Cunningham | A63B 45/02 | 206/232 |
| 7,608,782 B2 * | 10/2009 | Hill | H01R 4/48 | 174/84 C |
| 7,661,896 B2 * | 2/2010 | Zawitz | B43K 5/005 | 401/6 |
| D617,382 S * | 6/2010 | Guirlinger | B43K 23/002 | D19/83 |
| D640,743 S | 6/2011 | Guirlinger | | |
| D641,414 S | 7/2011 | Guirlinger | | |

(56) References Cited

U.S. PATENT DOCUMENTS

| | | | |
|---|---|---|---|
| 8,015,673 B2* | 9/2011 | Rodman | A41D 25/022 2/150 |
| 8,177,736 B2* | 5/2012 | Kopperschmidt | A61M 1/3653 24/335 |
| D665,449 S | 8/2012 | Guirlinger | |
| 8,235,262 B1* | 8/2012 | Sakdol | A42B 3/04 224/183 |
| 8,801,311 B1* | 8/2014 | Miller | B43K 23/02 24/298 |
| D720,400 S * | 12/2014 | Featherston | A44C 5/0046 D19/85 |
| D730,986 S * | 6/2015 | Moreau | D11/201 |
| D756,631 S * | 5/2016 | Praamsma | D3/219 |
| 9,409,437 B2* | 8/2016 | Green | B43K 29/02 |
| 2004/0237262 A1* | 12/2004 | Arnone | B43K 23/002 24/10 R |
| 2005/0074269 A1* | 4/2005 | Asselin | B43K 27/08 401/131 |
| 2006/0113345 A1* | 6/2006 | Zoullas | A45F 5/00 224/600 |
| 2006/0196900 A1* | 9/2006 | Sasick | A45F 5/00 224/183 |
| 2008/0044217 A1* | 2/2008 | Russell | A46B 17/02 401/7 |
| 2009/0097903 A1* | 4/2009 | Hermann | B42D 5/006 401/195 |
| 2009/0114144 A1* | 5/2009 | Keefe | B42D 9/005 116/234 |
| 2009/0202287 A1* | 8/2009 | Katsanevas | A45F 5/00 401/131 |
| 2011/0180681 A1 | 7/2011 | Guirlinger | |
| 2012/0085801 A1* | 4/2012 | Padilla | B42D 5/006 224/576 |
| 2012/0164610 A1* | 6/2012 | Pascale | B43K 23/001 434/159 |
| 2013/0295550 A1* | 11/2013 | Mullaguru | B43K 23/001 434/417 |
| 2014/0263496 A1* | 9/2014 | Zimmerman | B43K 23/016 224/222 |
| 2015/0024369 A1* | 1/2015 | Brown | B43K 23/001 434/416 |
| 2015/0224009 A1* | 8/2015 | Cedrone | F16M 13/04 128/845 |
| 2016/0108989 A1* | 4/2016 | Symons | A43C 7/06 24/136 R |
| 2016/0252800 A1* | 9/2016 | Jeong | A45F 5/00 224/576 |

* cited by examiner

LANYARD SLIDER WITH IMPLEMENT HOLDERS

BACKGROUND OF THE INVENTION

1. Field of the Invention

The present invention relates generally to lanyards and attachments for lanyards. More particularly, the present invention relates to a lanyard slider.

2. Description of the Prior Art

A lanyard is a cord typically worn around the user's neck to support a badge, tool, whistle, or other object. The ends of the lanyard cord typically are joined together with a connector, where the lanyard cord forms a closed loop. A lanyard slider is often attached over spaced apart sections of the lanyard cord and allowed to slide along the cord so that the user can adjust the size of the neck opening. Lanyard sliders of the prior art typically are small objects with a body of a circular, trapezoidal, or other shape and having an opening in the body or clip for the lanyard cord. The user inserts the cord ends or a looped cord through the opening or clip so that the slider is movable along the cord to adjust the size of the neck opening. Frequently, the end of the lanyard opposite the neck opening is attached to a connector that attaches to an access badge or other item. Variations on the lanyard slider have been introduced over the years.

U.S. Pat. No. 6,675,446 to Buettell discloses a two-piece slider for a lanyard that is adapted to be assembled for sliding on a lanyard cord. The slider is substantially cylindrical in shape that includes a first portion or cap and a second portion or base. The first portion has a round body with a flat surface that faces outwards and may be decorated with a logo or design. The first portion mates with the second portion with a snap fit. The second portion has at least one channel to receive a lanyard cord. In one embodiment, the first portion includes a non-circular protrusion that fits within a mating recess in the second portion to restrain the portions from rotation relative to one another. The slider portions can be readily assembled on a customer-selected lanyard cord and end fitting.

U.S. Pat. No. 4,049,357 to Hamisch, Jr. discloses a sliding coupling device for a lanyard or the like. The sliding coupling device is used to connect a first section of a flexible cord to a second portion and includes a pair of mating identical housing sections that are assembled to form a housing having an internal cavity. A hook-like clip portion projects from each housing section on one side of the cavity and snap fits into a corresponding aperture in the other housing section to form a positive attachment of the housing sections. The housing sections cooperate to define openings for receiving the cord sections. The cavity provides space for receiving opposite knotted end portions of the cord or a crimped fastener which connects opposite end portions of the cord. The cord sections extend directly through the cavity in the housing in parallel spaced relation.

U.S. Pat. No. Des. 338,037 to Miller et al. discloses a combined pen and lanyard. A lanyard cord forms a closed loop with a larger opening and a smaller opening, where ends of the cord are secured together by a crimp or clasp that also holds together aligned portions of the cord. One of the openings of the loop is intended to loop around the user's neck and therefore is much larger than the other, smaller opening. At the smaller opening, the cord extends through a cap of a pen, thereby securing the pen cap and attached pen to the lanyard cord. The pen can be removed from the cap for writing.

US published patent application no. 2011/0180681 to Guirlinger discloses a pen holder including an elongated base and a grip axially aligned with and connected to the top surface of the base. The grip has an interior wall defining an axial sleeve of generally circular cross sectional shape. The grip has a first jaw and a second jaw, where each jaw has a tapered end that define an axial slot. The jaws flex to receive and grip a generally cylindrical utensil inserted through the tapered axial slot into the axial sleeve. The holder can be attached to an object by adhering the base to the object using an adhesive on the bottom surface of the base. Optionally, the base has a pair of holes that extend through the base in a direction generally perpendicular to the top and bottom surfaces of the base. Screws may extend through the holes in the base to attach the holder to a wall or other surface. Alternately, a flexible cord may be threaded through the holes and used to support the holder.

SUMMARY OF THE INVENTION

Lanyard sliders of the prior art are adapted to slide along the lanyard cord, but lack any feature for holding a writing implement or similarly-shaped tool. These sliders are of no help to the user who wants to store a writing implement or similarly-shaped object on a cord around the user's neck in addition to using the lanyard to hold an access pass or other object. Other lanyards, such as one disclosed by Miller et al. include a pen connected to the lanyard. One disadvantage of the combined pen and lanyard is that the lanyard is not intended to connect to or hold other objects, such as an exhibition ID tag, flashlight, or other object because the lanyard lacks a feature to do so and the space typically used to hold the other object is occupied by the pen. Another deficiency of the combination pen/lanyard is that when the writing portion of the pen is lost or becomes useless, the combination of the lanyard and cap may only continue to be useful if the cap happens to fit another pen. For this same reason, the Miller et al. lanyard/pen is not useful for writing implements of different sizes without attaching the lanyard to the desired pen cap in advance. That is, the design of the Miller et al. lanyard/pen combination does not allow the user to choose the pen he or she wants to use with the lanyard. Also, the combination lacks the ability to hold more than one pen or writing implement. Further, the combination lacks the ability to use the lanyard to selectively and removably hold a wide variety of writing implements or similarly-shaped tools, such as pointers, fasteners, etc. having different diameters and/or cross-sectional shapes. Still further, even if the user adds additional fasteners or clips to the cord, the crimp being located close to the pen cap would result in an out-of-balance and clumsy connection to the pen and the other object(s), therefore frustrating the goal of holding both a pen and another object at the same time.

The Guirlinger pen holder described above has a sleeve with a generally circular cross-sectional shape of a predefined size. Since the shape is circular, the sleeve is unable to accommodate objects of a wide range of sizes. Also, openings that extend through the top and bottom surfaces of the holder define a tortuous path for a narrow, flexible strap threaded through these openings, such as a single length of a lanyard cord. This configuration allows the lanyard cord to rotate to inconvenient positions and the tortuous path is difficult to use on a lanyard cord because it does not permit the holder to slide easily along the cord. Also, the direction of the holes through the base and the small size of the base makes the holder suitable only for a thin, light-duty strap or cord. Further, the size and configuration of the Guirlinger holder makes it suitable as an accessory attached to a single strap, but the holder would not function well as a lanyard slider due to its narrow width and inability to accommodate many lanyards in the art.

Therefore, what is needed is an improved lanyard slider that not only slides along two lanyard cord portions of a lanyard cord, but also has the ability to selectively and removably hold at least one implement (e.g., writing implements, tools, elongate objects) or other objects of a variety of cross-sectional sizes and shapes. The present invention satisfies these and other objects by providing a lanyard slider with one or more implement holder attached to a slider body.

In one embodiment, the lanyard slider includes a plate-like slider body having a top surface, a bottom surface, a first side portion, and a second side portion. At least one cord opening extends longitudinally through the slider body along a cord opening axis extending between the top and bottom surface, where the cord opening is sized to receive a lanyard cord. The lanyard slider also has one or more implement holders that are contiguous with and extend from the slider body. Each implement holder has a first holder sidewall and a second holder sidewall extending in opposed and spaced apart relation from the slider body, where the first holder sidewall and the second holder sidewall define therebetween an implement passageway extending along a holder passageway axis.

In one embodiment, the cord opening(s) is (are) positioned between the first side portion, the second side portion, the top surface, and the bottom surface of the slider body.

In another embodiment, the lanyard slider has a single cord opening having a cross-sectional shape of a rectangle, a rectangle with rounded ends, an oval, an ellipse, or a circle, where the cord opening is sized to accommodate a first lanyard cord portion and a second lanyard cord portion extending side-by-side through the cord opening. In one embodiment, the single cord opening extends through a central portion of the slider body.

In another embodiment, each passageway axis is substantially parallel to a cord opening axis. In one embodiment, each passageway axis and each cord opening axis is substantially parallel to the plate-like slider body.

In another embodiment, the holder passageway has a cross-sectional shape selected from the group consisting of a rectangle, a rectangle with rounded ends, an oval, and a teardrop shape.

In another embodiment, the holder passageway defines a longitudinal gap between and separating a distal end portion of the first holder sidewall and a distal end portion of the second holder sidewall.

In one embodiment, the first sidewall portion and the second sidewall portion each generally extend transversely away from a top surface of the plate-like slider body. In another embodiment, the lanyard slider has two implement holders. A first implement holder extends laterally away from the first side portion of the plate-like slider body and the second implement holder extends laterally away from the second side portion of the plate-like slider body and in generally opposite direction of the first implement holder, where the implement holders are substantially coplanar with the plate-like slider body.

In another embodiment, the slider body and the implement holder(s) define a monolithic, unitary member. In one embodiment, the monolithic, unitary member is made of a resilient material.

In another embodiment, the slider body is made of a first material and each of the at least one implement holders is made of a second material different from the first material. Each implement holder is permanently affixed or connected to the slider body.

In another embodiment, the lanyard slider also includes a cap tether connected to the lanyard slider and a cap connected to the cap tether, where the cap has a cap body that defines a blind cylindrical bore extending into the cap body. In one embodiment, the cap tether, the cap, the slider body, and the implement holder(s) define a monolithic, unitary member.

In another embodiment, the lanyard slider includes a lanyard cord. In one embodiment, the lanyard cord extends through the cord opening(s) and defines a permanently closed loop.

DETAILED DESCRIPTION OF THE PREFERRED EMBODIMENT

Figure 1:
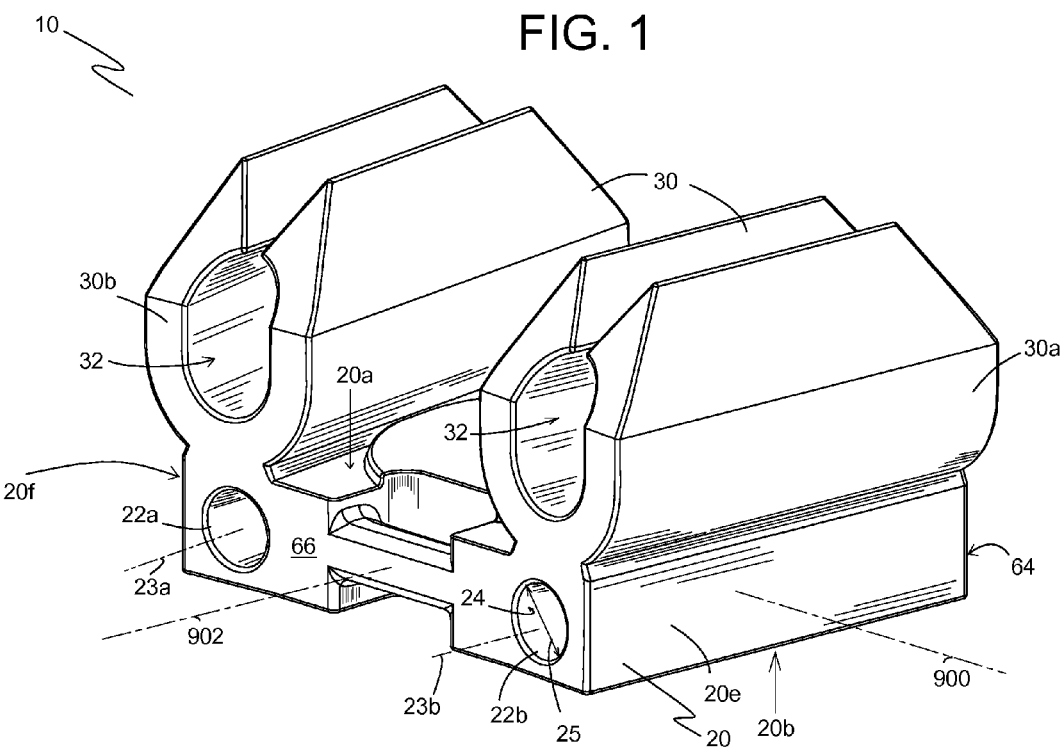
FIG. 1 is a front, top, and right-side perspective view of one embodiment of a lanyard slider of the present invention showing implement holders extending transversely from the top of the slider body.
Figure 2:
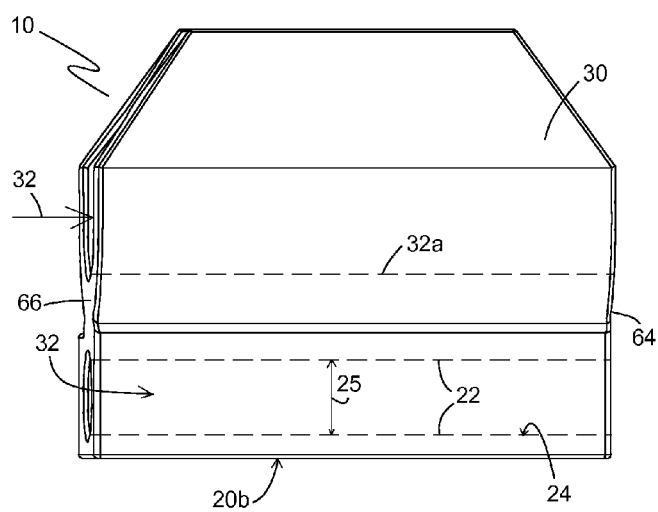
FIG. 2 is a right-side elevational view of lanyard slider of FIG. 1.

The preferred embodiments of the present invention are illustrated in FIGS. 1-16. FIG. 1 is a front, top, and right-side perspective view of one embodiment of a lanyard slider 10 of the present invention. FIG. 2 illustrates a right-side view of lanyard slider 10. Lanyard slider 10 includes a slider body 20 and at least one implement holder 30 attached to or connected to slider body 20. In one embodiment, implement holder(s) 30 and slider body 20 define a monolithic, unitary object that is formed, for example, using injection molding.

In one embodiment, slider body 20 is substantially plate-like and extends along a longitudinal axis 902 and along a transverse axis 900. Slider body has overall shape of a trapezoid, square, circle, or other regular or irregular geometric shape with a bottom surface 20b and a top surface 20a of slider body 20. In the illustrated embodiment in FIG. 1, slider body 20 also includes a front surface 20c at a front end 66, a back surface 20d at a rear end 64, a right side surface 20e, and a left side surface 20f.

Slider body 20 defines at least one cord opening 22 or bore extending therethrough along a cord opening axis 23 between a front surface 20c and a back surface 20d (not shown) of slider body 20. Cord opening axis 23 is located between top surface 20a and bottom surface 20b of slider body. Each cord opening 22 is sized to receive a lanyard cord 90 or the like therethrough (shown in FIG. 9). In one embodiment, cord opening(s) 22 have a longitudinal cord slot 22c (not shown) along the entire longitudinal length of the cord opening 22 such that the longitudinal cord slot 22c provides access for removably installing lanyard cord 90 within cord opening 22.

Figure 4:
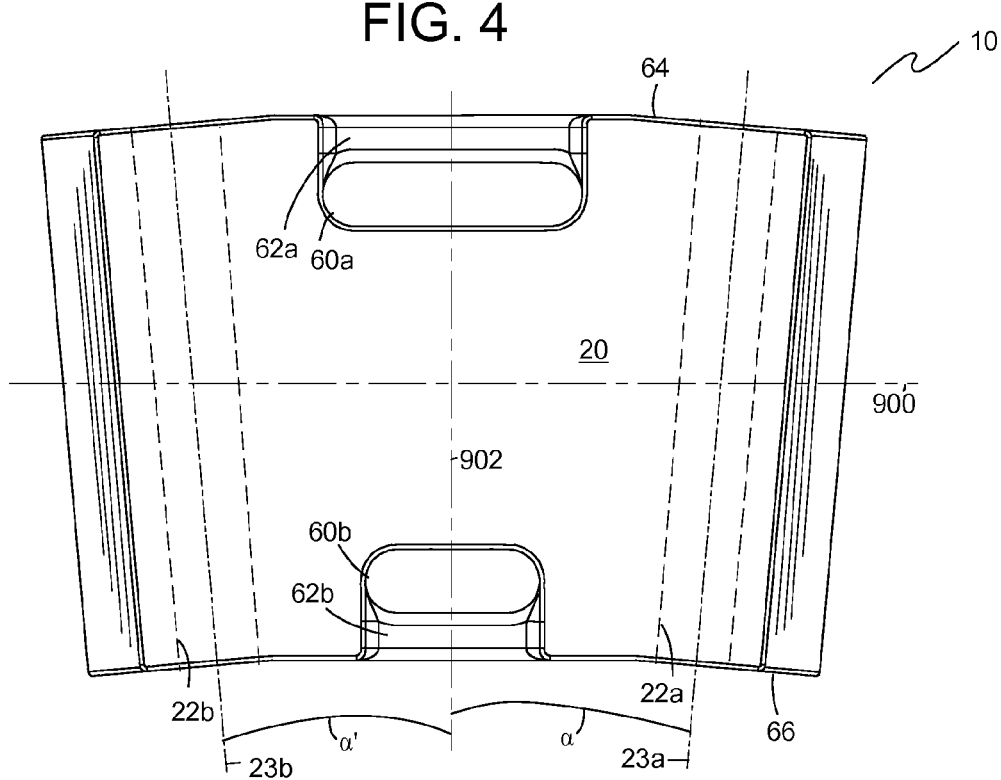
FIG. 4 is a bottom plan view of the lanyard slider of FIG. 1 showing the orientation of the cord openings with respect to the slider body.

Optionally, one or more of cord openings 22 is inclined at an angle α to longitudinal axis 902 of slider body 20 as shown in FIG. 4).

Each cord opening 22 is sized to receive therethrough a portion of lanyard cord 90. Cord opening diameter 25 is at least the dimension of lanyard cord 90, which in some embodiments is about 3/16 inch. When cord opening diameter 25 is slightly greater than the dimension of lanyard cord 90, lanyard slider 10 can be moved easily along lanyard cord 90 by the user, yet otherwise frictionally engages lanyard cord 90 to maintain its position on lanyard cord 90. In one embodiment, slider body 20 includes two cord openings 22, where a first lanyard cord portion 90a passes through a first cord opening 22a and a second lanyard cord portion 90b passes through a second cord opening 22b.

Figure 3:
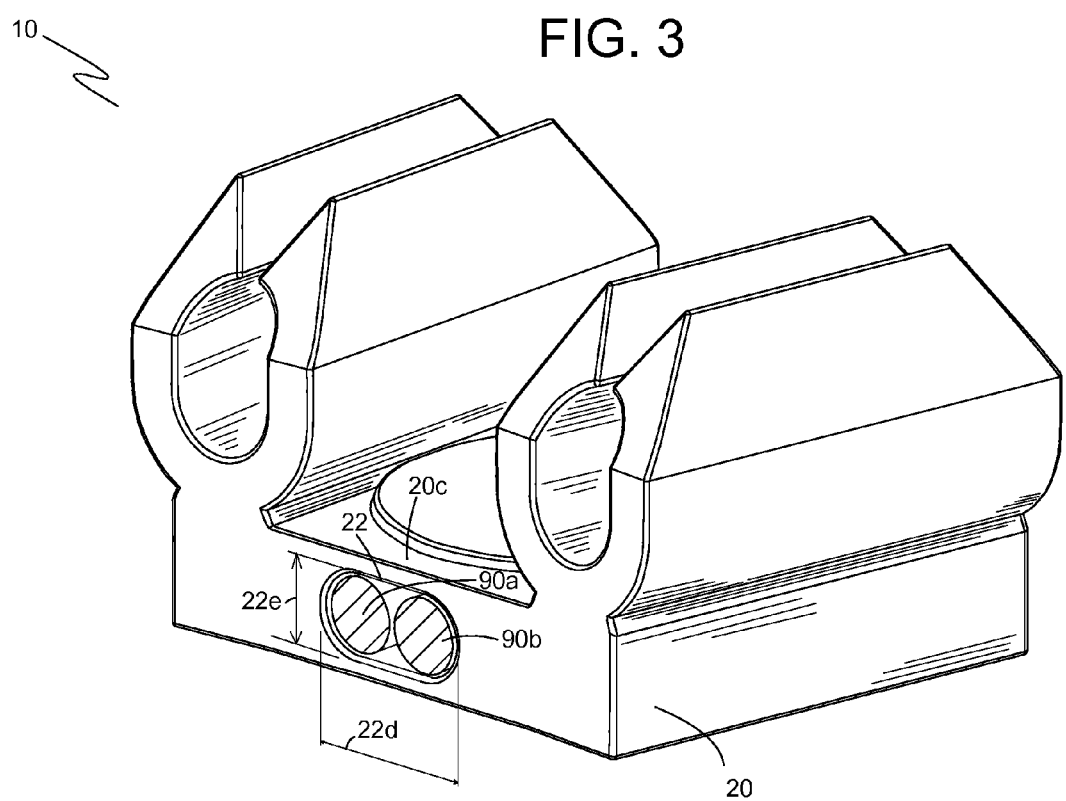
FIG. 3 is a front, top, and right-side perspective view of another embodiment of a lanyard slider showing a cord opening sized and shaped to receive first and second portions of a lanyard cord.

Referring to FIG. 3, a perspective view shows another embodiment of lanyard slider 10 with cord opening extending through a central portion 20c of slider body 20. Here, cord opening 22 has a size sufficient to accommodate both of first lanyard cord portion 90a and second lanyard cord portion 90b through one cord opening 22. As illustrated, for example, cord opening 22 has an oval shape with a transverse dimension 22d (e.g., width) being at least twice the vertical dimension 22e (e.g., height). Thus, first and second lanyard cord portions 90a, 90b both extend through a single cord opening 22 in a side-by-side arrangement. Other shapes of cord opening 22 for this embodiment are acceptable, such as a circle, oval, hourglass, rectangle, etc. so long as cord opening 22 is sized to accommodate both of first and second lanyard cord portions 90a, 90b. In one embodiment transverse dimension 22d and/or vertical dimension 22e of cord opening 22 optionally tapers from smaller to larger as cord opening 22 extends towards rear end 64. Such a taper is useful to accommodate the tendency for first and second lanyard cord portions 90a, 90b to diverge as they extend from slider 10 to form a loop around the user's neck.

Figure 5:
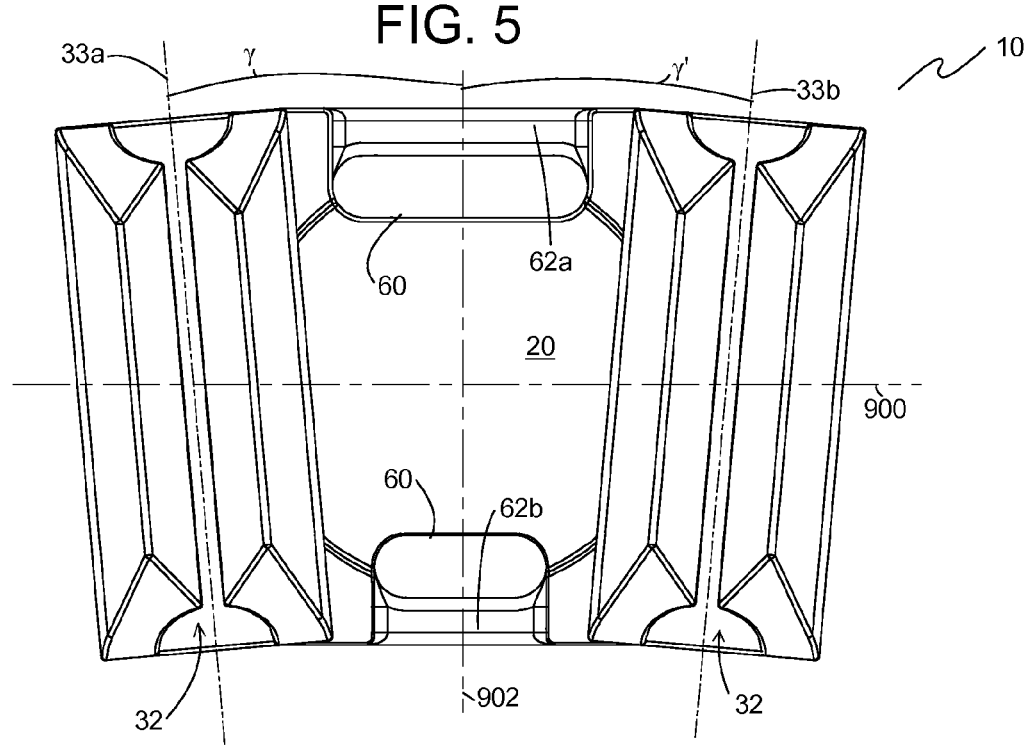
FIG. 5 is a top plan view of the lanyard slider of FIG. 1 showing the orientation of the implement holders with respect to the slider body.

Referring now to FIGS. 4 and 5, lanyard slider 10 of FIGS. 1-2 is shown in a bottom plan view and a top plan view, respectively. As shown in broken lines in the bottom view of FIG. 4, first and second cord openings 22a, 22b extend along respective first and second cord opening axes 23a, 23b that define respective angles α, α' with longitudinal axis 902 of slider body 20. In one embodiment, angle α is between about 10° and about 30°. In one embodiment, angle α is about 15°. In the embodiment shown in FIG. 1, first cord opening 22a and second cord opening 22b extend along respective first cord opening axis 23a and second cord opening axis 23b. First and second cord opening axes 23a, 23b are symmetrical about and inclined to longitudinal axis 902. It is not required, however, that cord openings 22 or slider body 20 be symmetrical. In such an embodiment, cord openings 22 are optimally aligned to substantially coincide with lanyard cord 90 extending around an user's neck, where a first lanyard cord portion 90a and a second lanyard cord portion 90b each approach lanyard slider 10 substantially along respective first and second cord opening axes 23a, 23b. Cord openings 22 being inclined at angle α also facilitates sliding lanyard slider 10 up and down along lanyard cord 90 as desired.

Each holder passageway 32 extends generally longitudinally along an implement passageway axis 33 (shown in FIG. 5). One embodiment of lanyard slider 10 has implement passageway axis 33 coincident with cord opening axis 23. As viewed from above looking at top surface 20a, implement passageway axis 33 defines an angle γ with longitudinal axis 902 of slider body 20. In some embodiments, angle γ has the same acceptable value range as does angle α; in some embodiments angle γ equals angle α. One advantage of inclining implement holders 30 at angle γ so that they converge moving from back 64 to front 66 and diverge moving from front 66 to back 64, is that implements 200 (e.g., ink pens) held in each of implement holders 30 can be positioned so that the writing end of the pens are positioned out of the way of the user when lanyard slider 10 is used on a lanyard cord 90 around the user's neck. This position of implements 200 prevents snagging on and rubbing against the converging ends (e.g., writing ends) of implements 200.

Optionally, some embodiments of slider body 20 include at least one handle opening 60 extending substantially perpendicularly to top surface 20a and bottom surface 20b. Handle opening 60 defines a handle 62. In one embodiment, slider body 20 has a first handle opening 60a proximate rear end 64 and positioned so that a first handle 62a is substantially centered on and extending along rear end 64. Similarly, a second handle opening 60b is proximate front end 66 and positioned so that a second handle 62b is substantially centered on and extends along front end 66 of slider body 20. Handle(s) 62 can be used for attaching additional items to lanyard slider 10 by way of clips, string, a length of material, or other means.

In one embodiment, slider body 20 is solid or substantially solid (except for cord openings 22, etc.) and is made of rubber, foam, plastic, polymers, wood, metal, or other materials, depending on the appearance and flexibility desired. Where rigid materials such as wood, metal, or hard plastic are used for slider body 20, other more flexible materials are typically used for implement holder(s) 30 to allow implement holders to flex to accept objects of various sizes. For example, implement holders 30 are made of rubber and are fixedly adhered to slider body 20 made of metal or hard plastic. In one embodiment, an outside body surface 20a and/or a cord opening inside surface 24 slider body 20 have a predefined dynamic coefficient of friction when disposed in sliding contact with other objects made of polymers, wood, metal, glass, fabric, and other materials. For example, lanyard slider 10 has a dynamic coefficient of friction of 0.25, 0.50, 0.75, 1.0 or greater when in sliding contact with a second surface, such as an object of hard plastic or metal held in implement holder 30 or lanyard cord 90.

As appreciated by one of ordinary skill in the art, the static coefficient of friction is generally greater than the dynamic coefficient of friction. In one embodiment, the combination of the surface characteristics of cord opening inside surface 24 and a diameter 25 of cord opening 22 is sufficient to frictionally engage lanyard cord 90 and retain lanyard slider 10 in a chosen vertical position on lanyard cord 90 when worn around the user's neck, or the like. In some embodiments, this condition is also met when lanyard slider 10 receives and retains one or more implement 200 or other object in implement holder(s) 30. Stated differently, lanyard slider 10 is intended to maintain its position on lanyard cord 90 whether loaded with objects or not, but can be selectively moved along lanyard cord 90 by the user.

Figure 6:
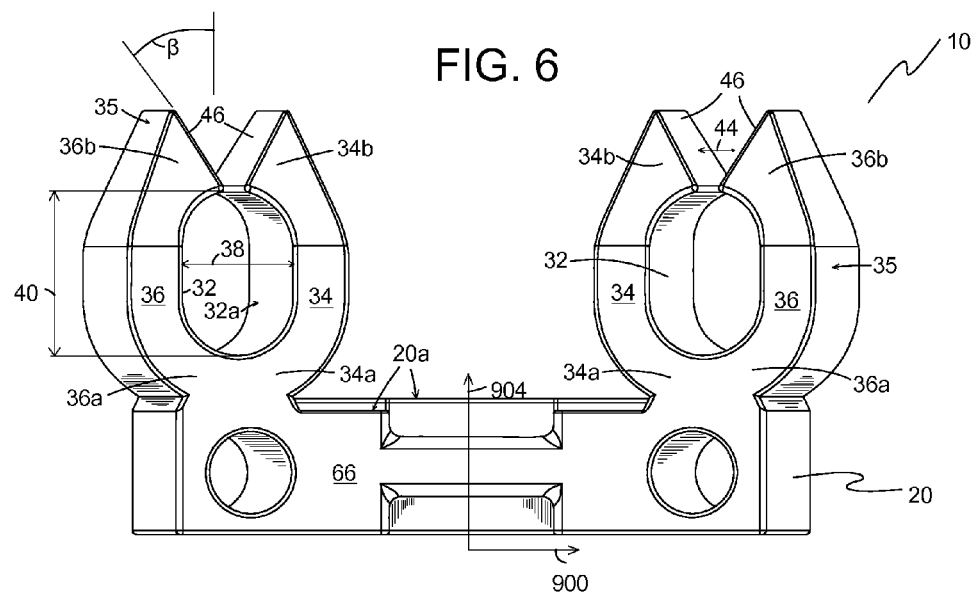
FIG. 6 is a front elevational view of the lanyard slider of FIG. 1 showing the structure and shape of the implement holders.

Turning now to FIG. 6, lanyard slider 10 of FIG. 1 is illustrated in a front elevational view. Transverse (X) axis 900 and vertical (Z) axis 904 are shown for reference. Each implement holder 30 defines an implement passageway 32 (e.g., a through-opening or channel) that is sized to receive and retain an implement 200 (shown in FIG. 9). Each holder passageway 32 has a holder passageway inside surface 32a that extends longitudinally along first holder sidewall 34 and a second holder sidewall 36. First holder sidewall 34 is substantially aligned with and spaced apart from second holder sidewall 36 along its longitudinal dimension.

In one embodiment, holder passageway 32 has an overall cross-sectional shape of a rectangle with rounded ends. Other cross-sectional shapes are acceptable and include a circle, a square, a rectangular, an oval, a star, a slot, a teardrop shape, and other regular or irregular shapes, provided that the cross-sectional shape of holder passageway 32 is capable of frictionally engaging an object received in holder passageway 32. The cross-sectional shape of holder passageway 32 typically has a first passageway dimension 38 (e.g., width as shown in FIG. 6) consistent with a diameter of common pens, pencils, and the like. In one embodiment, holder passageway has first passageway dimension 38 of about ¼ inch and a second passageway dimension 40 (e.g., height as shown in FIG. 6) of about ⅜ inch. In one embodiment, both of first passageway dimension 38 and second passageway dimension 40 are constant along the entire longitudinal distance of holder passageway 32; however, one or both of first and second passageway dimensions 38, 40 may optionally increase along the longitudinal distance to better engage tapered objects.

In one embodiment, first and second holder sidewalls 34, 36 extend from slider body 20 and have an arcuate shape as viewed looking at front end 66 of lanyard slider 10. First and second holder sidewalls 34, 36 extend transversely (e.g., substantially perpendicularly) from top surface 20a of slider body 20. Accordingly, first holder sidewall 34 has a proximal end portion 34a connected to slider body 20 and a distal end portion 34b extending away from top surface 20a. Similarly, second holder sidewall 36 has a proximal end portion 36a connected to slider body 20 and a distal end portion 36b extending away from top surface 20a. A longitudinal gap 44 separates distal end portions 34b, 36b of first and second holder sidewalls 34, 36, respectively, along the longitudinal distance of implement holder 30. In one embodiment, longitudinal gap 44 separates distal end portions 34b, 36b by at least about 1/16 inch. It is acceptable for distal end portions 34b, 36b to have more separation, less separation, or no separation (i.e., abutting, but separate).

In one embodiment, one or both of distal end portions 34b, 36b has a sloped longitudinal entrance face 46 from holder outside surface 35 to or towards holder passageway inside surface 32a. Sloped longitudinal entrance face 46 defines longitudinal gap 44 as having a wedge shape between distal end portions 34b, 36b. Having one or more sloped longitudinal entrance face 46 facilitates the user in spreading first and second holder sidewalls 34, 36 to insert an implement into implement passageway 32. For example, a user may press a pen into implement passageway 32 by aligning it with implement holder 30 and then pressing it against sloped longitudinal entrance faces 46 to cause first and second holder sidewalls 34, 36 to separate enough to permit the pen to pass and be received in implement passageway 32. In the embodiment shown in FIG. 6, sloped longitudinal entrance faces 46 define an angle $\beta$ with vertical axis 904, where $\beta$ is approximately 30°. Greater or lesser values of $\beta$ are acceptable.

Each holder passageway 32 is adapted to receive an elongated implement 200, such as a writing implement (e.g., pen, pencil, marker, crayon), pointer, stick, length of tubing, a tool (e.g., screwdriver, knife, file, chemoluminescent light stick, flashlight), fastener (e.g., screw, nail, bolt), or a wide variety of other objects. It is contemplated that implement holder 30 is also capable of holding other non-elongated objects having a size (or a portion of the object having a size) that can be received in implement passageway 32, such as a ball bearing or a hex nut.

Figure 7:
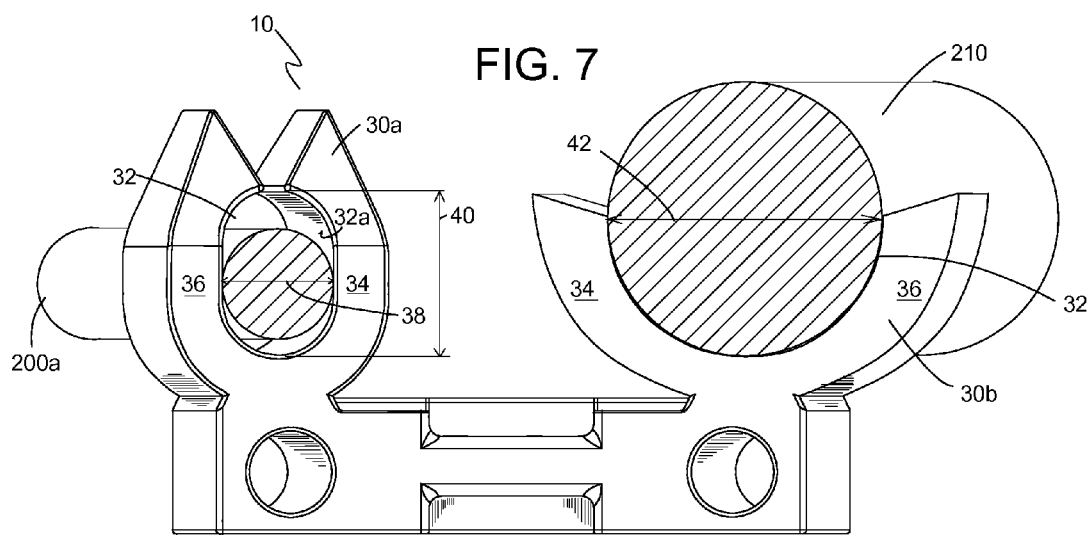
FIG. 7 is a front elevational view of the lanyard slider of FIG. 1 showing a first implement holder in a resting position engaging a first implement and a second implement holder forced open to engage a larger second implement.

Referring now to FIG. 7, lanyard slider 10 of FIG. 1 is shown in a front elevational view with a first implement 200a received in first implement holder 30a and a second implement 210 received in second implement holder 30b. First implement 200a has a diameter about equal to first passageway dimension 38. Second implement 210 has a diameter about equal to a combined passageway dimension 42, which is discussed below.

Being made of a flexibly resilient material, first and second holder sidewalls 34, 36 can be spread apart so that holder passageway 32 can receive and grip, for example, an implement with a diameter about equal to second passageway dimension 40. Also, being made of a flexibly resilient material enables first and second holder sidewalls 34, 36 to be spread apart and shaped substantially into a semicircular shape corresponding to the circular shape of implement 200, where implement 200 has a diameter about equal to first passageway dimension 38 plus second passageway dimension 40, which is referred to herein as combined passageway dimension 42. For example, when holder passageway 32 has a rectangular shape with rounded ends and having first dimension 32 of about ¼ inch and second passageway dimension of about ⅜ inch, implement passageway 32 can take the shape of a semicircle with a diameter of about ⅝ inch to receive and grip a pen with a diameter of about ⅝ inch. Thus, implement passageway 32 can receive, grip, and retain implements with a diameter in a range from about ¼ inch (first passageway dimension 38) to about ⅝ inch (combined passageway dimension 42).

The combination of implement holder 30 being made of flexibly resilient materials and second passageway dimension 40 being greater than first passageway dimension 38 enables implement passageway 32 to receive and frictionally engage implements 200 having a cross-sectional dimension that is equal to or greater than the smaller first passageway dimension 38. Thus, some embodiments of implement holder 30 are adjustable to receive and grip objects of different cross-sectional dimensions (e.g., thickness).

Figure 8A:
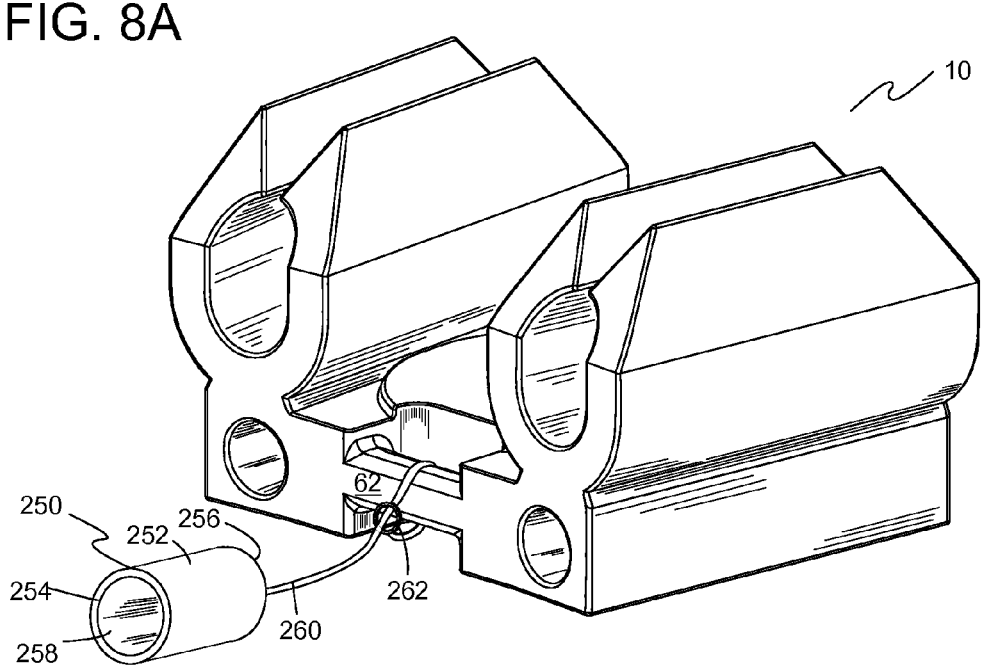
FIG. 8A is perspective view of another embodiment of a lanyard slider of the present invention showing an optional cap and cap tether looped around a handle of the slider body.
Figure 8B:
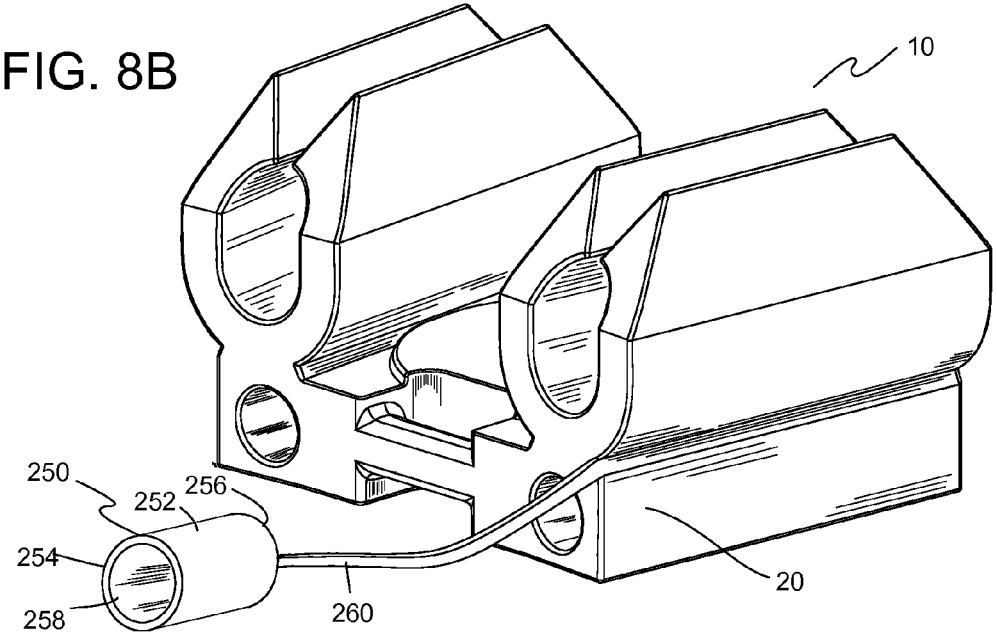
FIG. 8B is a perspective view of another embodiment of a lanyard slider of the present invention showing a cap tether integrally connected to the lanyard slider.

Referring now to FIGS. 8A and 8B, a perspective view shows another embodiment of lanyard slider 10 that includes an optional cap 250 connected to lanyard slider with a cap tether 260. Cap tether 260 can be a relatively thin, flexible length of material that connects cap 250 to lanyard slider 10. Cap 250 includes a cap body 252 with an open cap end 242 and a closed cap end 256 where cap body 252 defines a blind cylindrical bore 258 sized to receive a particular implement 200.

In one embodiment shown in FIG. 8A, cap tether 260 includes a tether ring 262 where cap tether 260 is looped through tether ring 262 to form a loop around handle 62 or other part of lanyard slider 10. In other embodiments as shown in FIG. 8B, cap tether 260 extends contiguously as one piece from slider body 20. For example, cap 250, cap tether 260, and slider body 20 are integrally formed as one monolithic unit. Cap 250 is useful, for example, to cover the writing end of a pen.

Figure 9:
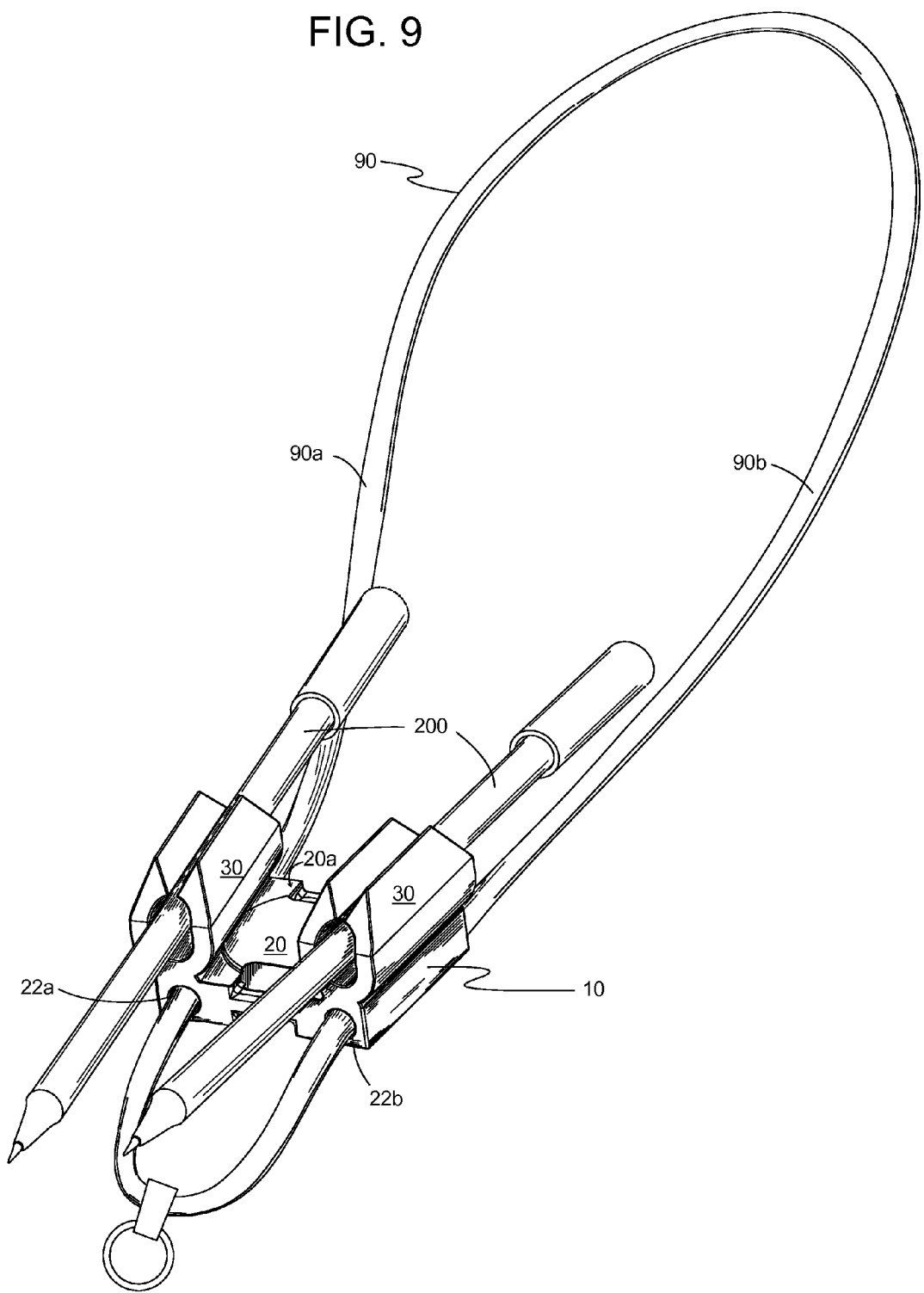
FIG. 9 is a perspective view of the lanyard slider of FIG. 1 shown with an implement received in each implement holder.

Referring now to FIG. 9, a front, top, and side perspective view shows one embodiment of lanyard slider 10 with implement holders 30 extending substantially perpendicularly from top surface 20a of slider body 20. Lanyard slider 10 is installed on lanyard cord 90 that defines a closed loop. First lanyard cord portion 90a extends through first cord opening 22a and second lanyard cord portion 90b extends through cord opening 22b. Implements 200 are received in and gripped by implement holders 30.

Figure 10:
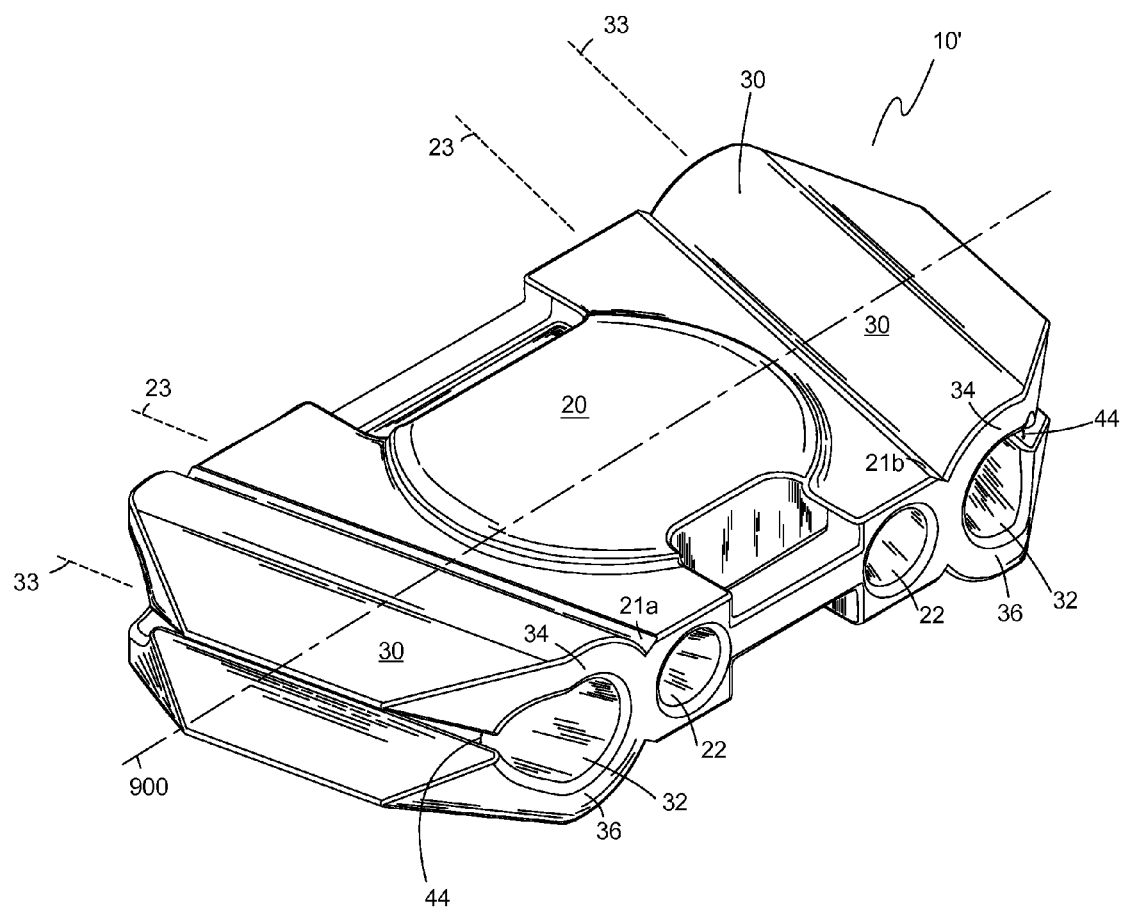
FIG. 10 is a front, top, and left-side perspective of another embodiment of a lanyard slider of the present invention showing implement holders extending laterally from each side of the slider body.

Referring now to FIG. 10, another embodiment of lanyard slider 10' is illustrated in a top, front, and side perspective view. Compared to embodiments discussed above with reference to FIGS. 1-9, implement holders 30 in this embodiment extend from slider body 10 laterally, where first and second holder sidewalls 34, 36 extend substantially in the direction along a transverse axis 900 of slider body 10. In one embodiment, cord opening(s) 22 and implement holder(s) 30 extend along respective cord opening axis 23 and implement passageway axis 33 that are adjacent one another along first and second side portions 21a, 21b. As such, slider body 20 and implement holders 30 define together a flattened plate-like object having a plurality of through-openings or passageways (e.g., cord openings 22, implement holder passageways 32).

Figure 11:
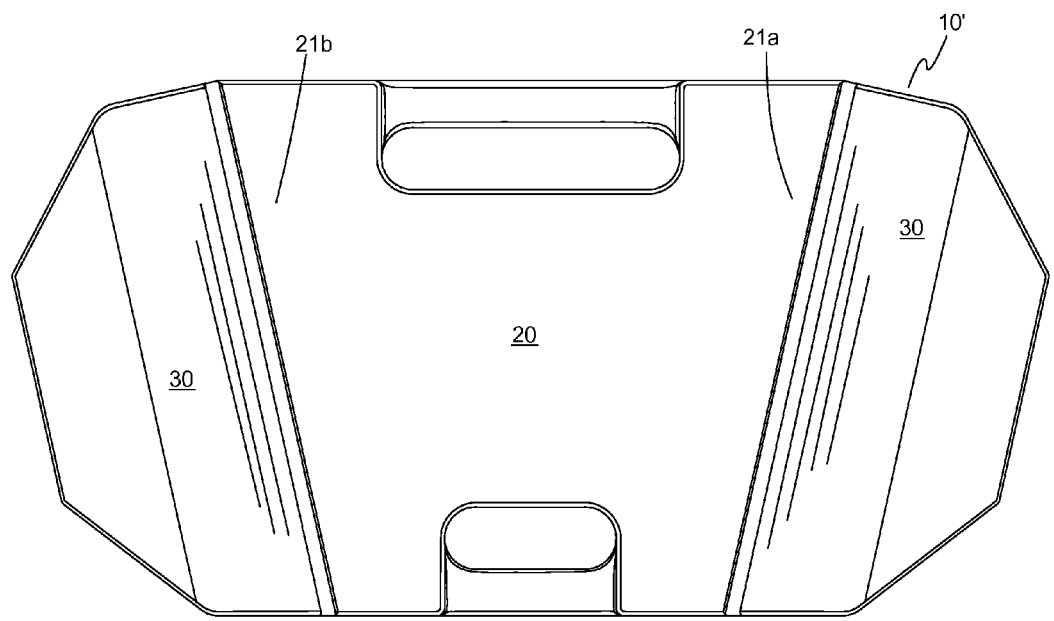
FIG. 11 is a bottom plan view of the lanyard slider of FIG. 10.
Figure 12:
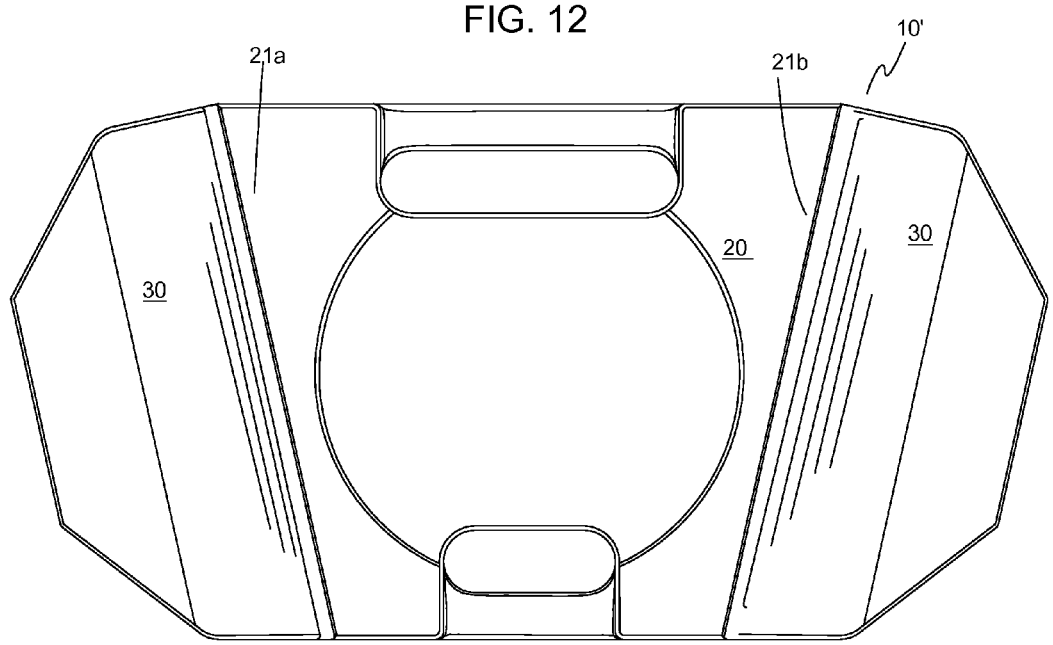
FIG. 12 is a top plan view of the lanyard slider of FIG. 10.

Referring now to FIGS. 11 and 12, lanyard slider 10' of FIG. 10 is shown in a bottom plan view and a top plan view, respectively, with implement holders 30 extending laterally from first side portion 21a and from second side portion 21b of slider body 20. Implement holders 30 are substantially coplanar with slider body 20 where slider body 20 is positioned between implement holders 30.

Figure 13:
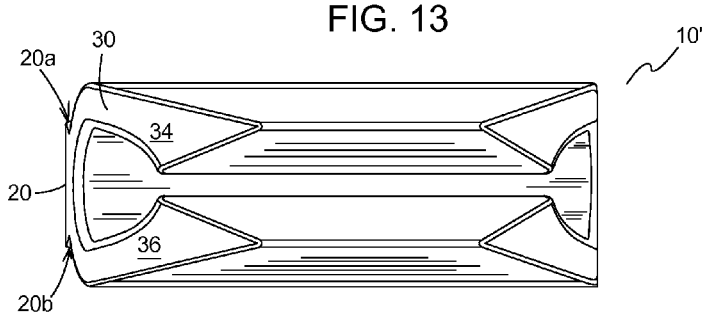
FIG. 13 is a right-side elevational view of the lanyard slider of FIG. 10.

FIG. 13 illustrates a side elevational view of lanyard slider 10'. First holder sidewall 34 and second holder sidewall 36 extend substantially parallel to top surface 20a and bottom surface 20b, respectively, of slider body 20. Optionally, longitudinal gap 44 is substantially centered between top surface 20a and bottom surface 20b of slider body 20.

Figure 14:
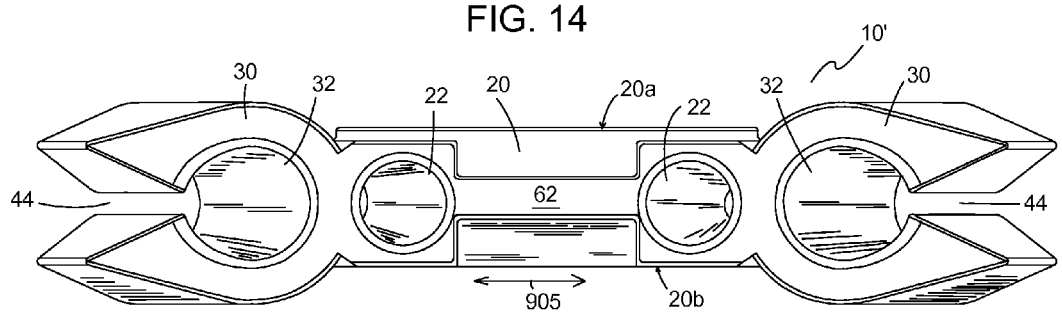
FIG. 14 is a front elevational view of the lanyard slider of FIG. 10.
Figure 15:
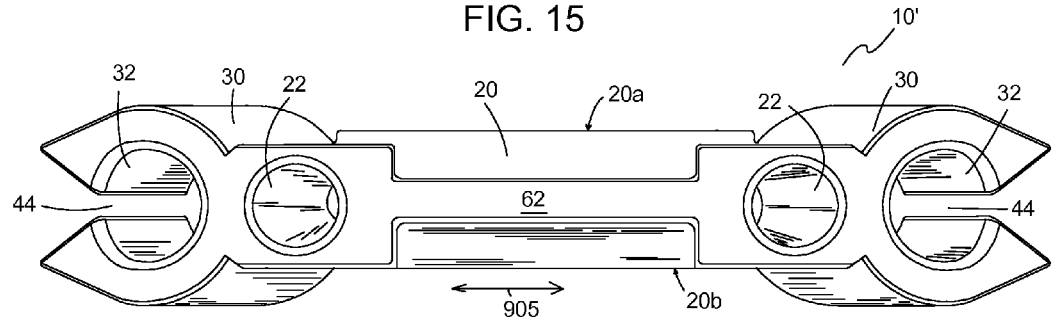
FIG. 15 is a rear elevational view of the lanyard slider of FIG. 10.

Referring now to FIGS. 14 and 15, front and rear elevational views, respectively, show lanyard slider 10' with longitudinal gap 44 of implement holders 30 positioned between top surface 20a and bottom surface 20b of slider body 20. Optionally, centers of lanyard cord openings 22, holder passageways 32, and handles 62 are all aligned along or parallel to X-Y plane 905.

Figure 16:
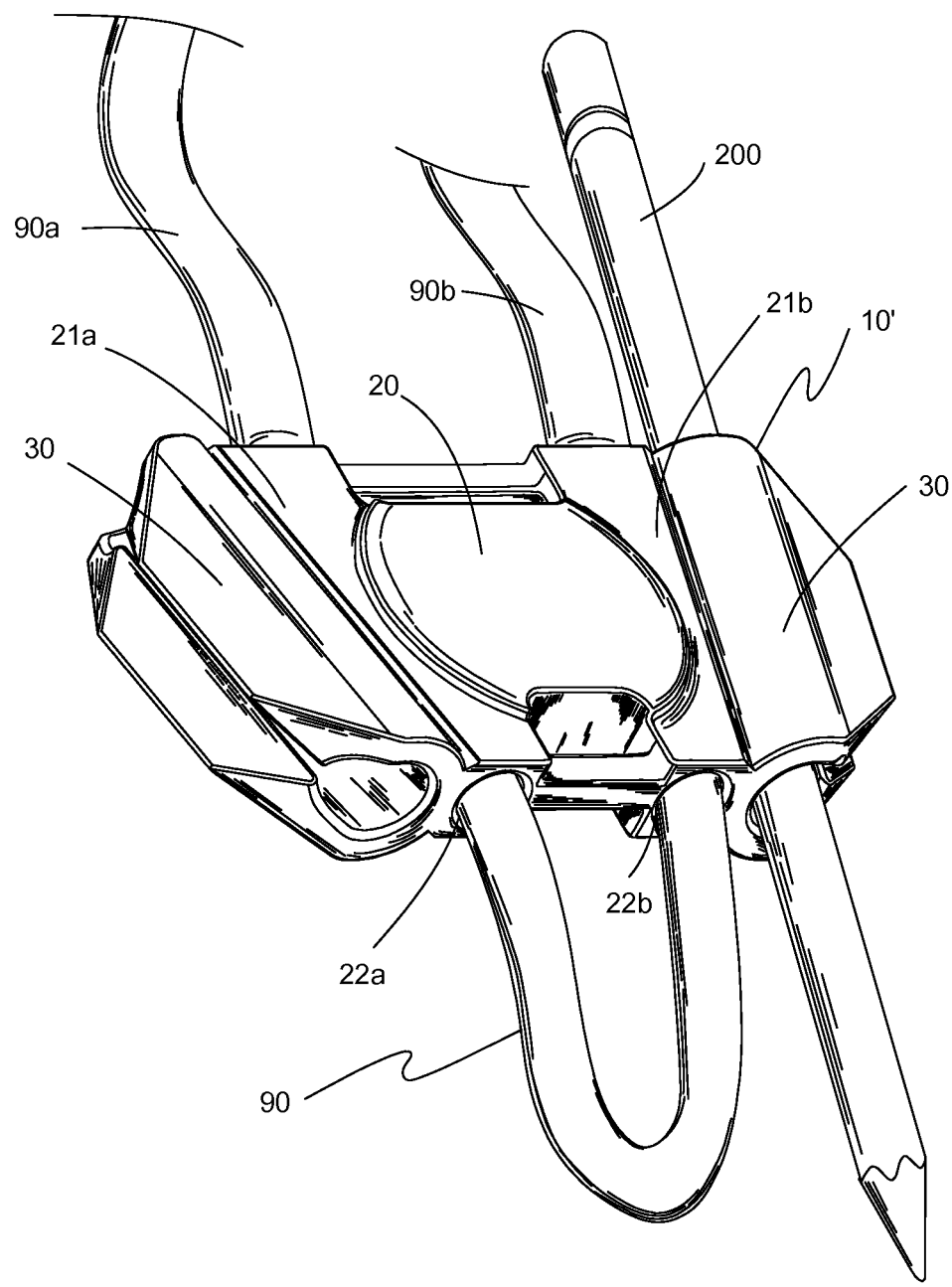
FIG. 16 is a top, front, and left-side perspective view of the lanyard slider of FIG. 10 showing a part of a lanyard cord and an implement received in one of the implement holders.

Referring now to FIG. 16, a front, top, and side perspective view shows lanyard slider 10' with implement holders 30 extending laterally from first side portion 21a and second side portion 21b of slider body 20. Lanyard slider 10 is installed on lanyard cord 90, a portion of which is shown with first lanyard cord portion 90a extending through first cord opening 22a and second lanyard cord portion 90b extending through cord opening 22b. Implement 200 is received in and gripped by one of implement holders 30.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

The invention claimed is:

1. A lanyard slider comprising:
a plate-like slider body having a principal top surface, a principal bottom surface, a first side portion, a second side portion, a front surface, and a back surface, wherein the front surface and the back surface extend vertically between the principal top surface and the principal bottom surface which are substantially planar, parallel, and opposite one another;
the plate-like slider body defining a longitudinal bore located between the principal bottom surface and the principal top surface and extending through the slider body from the front surface to the back surface;
a first implement holder contiguous with and extending from the slider body, the implement holder having a first holder sidewall and a second holder sidewall extending in opposed and spaced apart relation to one another, wherein the first holder sidewall and the second holder sidewall define therebetween an elongated implement passageway having an axis aligned generally parallel to an axis of the longitudinal bore;
a second implement holder contiguous with the slider body, the second implement holder having a first holder sidewall and a second holder sidewall extending in opposed and spaced apart relation to one another, wherein the first holder sidewall and the second holder sidewall define therebetween a second elongated implement passageway having an axis aligned generally parallel to the axis of the longitudinal bore and the axis of the first implement holder; and
the first implement holder and the second implement holder being spaced apart from one another, such that at least a portion of the principal top surface extends between the second holder sidewall of the first implement holder and the first holder sidewall of the second implement holder.

2. The lanyard slider of claim 1, wherein a cross-sectional size of an opening of the longitudinal bore is sized at least 3/16 of an inch to accommodate a first lanyard cord portion and a second lanyard cord portion extending side-by-side therethrough.

3. The lanyard slider of claim 2, wherein the longitudinal bore has a cross-sectional shape selected from the group consisting of a rectangle, a rectangle with rounded ends, an oval, an ellipse, and a circle.

4. The lanyard slider of claim 1, wherein the axis of the first elongated implement passageway, the axis of the second elongated implement passageway, the principal top surface and the principal bottom surface are substantially parallel to the axis of longitudinal bore.

5. The lanyard slider of claim 1, wherein the elongated implement passageway has a cross-sectional shape selected from the group consisting of a rectangle, a rectangle with rounded ends, and an oval.

6. The lanyard slider of claim 1, wherein the elongated implement passageway defines a longitudinal gap between and separating a distal end portion of the first holder sidewall and a distal end portion of the second holder sidewall.

7. The lanyard slider of claim 6, wherein the first holder sidewall and the second holder sidewall of the first elongated implement passageway and the first holder sidewall and the second holder sidewall of the second elongated implement passageway each extend parallel to the first side portion and transversely away from the principal top surface of the plate-like slider body.

8. The lanyard slider of claim 6, wherein the first implement holder extends laterally away from the first side portion of the plate-like slider body and the second implement holder extends laterally away from the second side portion of the plate-like slider body wherein the first implement holder and the second implement holder are substantially coplanar with the plate-like slider body.

9. The lanyard slider of claim 1, wherein the slider body lies in a first plane; the first implement holder; and the second implement holder define a monolithic, unitary member.

10. The lanyard slider of claim 9, wherein the monolithic, unitary member is made of a resilient material such that the first holder sidewall and the second holder sidewall of the first elongated implement passageway and the first holder sidewall and the second holder sidewall of the second elongated implement passageway are capable of transitioning between first contracted positions and second extended positions, respectively; and wherein the portion of the principal top surface extending between the second holder sidewall of the first implement holder and the first holder sidewall of the second implement holder is sized to simultaneously facilitate the transitions of the second holder sidewall of the first implement holder and the first holder sidewall of the second implement holder between the first positions and the second positions, respectively, without interference therebetween.

11. The lanyard slider of claim 1, further comprising:
a cap tether connected to the plate-like slider body; and
a cap connected to the cap tether, wherein the cap has a cap body that defines a blind cylindrical bore extending into the cap body.

12. The lanyard slider of claim 11, wherein the cap tether, the cap, the plate-like slider body, and the implement holder define a monolithic, unitary member.

13. A system for adjustably and releasably holding implements of varying sizes comprising:
a plate-like slider body having a principal top surface, a principal bottom surface, a first side portion, a second side portion, a front surface, and a back surface, wherein the front surface and the back surface vertically extend transversely to and between the principal top surface and the principal bottom surface which are substantially planar, parallel, and opposite one another;
the plate-like slider body defining at least one cord opening extending longitudinally therethrough, the principal bottom surface lying in a plane extending parallel to an axis of the at least one cord opening, and the at least one cord opening located between the principal bottom surface and the principal top surface;
a first implement holder contiguous with and extending from the plate-like slider body, the first implement holder having a first holder sidewall and a second holder sidewall extending in opposed and spaced apart relation to one another, wherein the first holder sidewall and the second holder sidewall define therebetween a first elongated implement passageway having an axis aligned generally parallel to the axis of the at least one cord opening;
a second implement holder contiguous with the plate-like slider body, the second implement holder having a first holder sidewall and a second holder sidewall extending in opposed and spaced apart relation to one another, wherein the first holder sidewall and the second holder sidewall define therebetween a second elongated implement passageway having an axis aligned generally parallel to the axis of the first implement holder and the axis of the at least one cord opening;
the first implement holder and the second implement holder being spaced apart from one another, such that at least a portion of the principal top surface extends between the second holder sidewall of the first implement holder and the first holder sidewall of the second implement holder; and
a first portion of a closed loop lanyard cord extending through the at least one cord opening.

14. The system for adjustably and releasably holding implements of varying sizes of claim 13, wherein the plate-like slider body, the first implement holder, and the second implement holder define a monolithic, unitary member made of a resilient material;
the first holder sidewall and the second holder sidewall of the first elongated implement passageway are each capable of transitioning between a first contracted position and a second extended position;
the first holder sidewall and the second holder sidewall of the second elongated implement passageway are each capable of transitioning between a first contracted position and a second extended position;
the portion of the principal top surface extending between the second holder sidewall of the first implement holder and the first holder sidewall of the second implement holder is sized to simultaneously facilitate, without interference therebetween: (a) the transition of the second holder sidewall of the first implement holder between the first contracted position and the second extended position, and (b) the transition of the first holder sidewall of the second implement holder between the first contracted position and the second extended position.

15. The system for adjustably and releasably holding implements of varying sizes of claim 13, wherein the first holder sidewall and the second holder sidewall each generally extend up from the principal top surface of the plate-like slider body.

16. A lanyard and lanyard slider combination comprising:
a lanyard cord;
a plate-like slider body having a principal top surface, a principal bottom surface, a first side portion, a second side portion, a front surface, and a back surface, wherein the front surface and the back surface extend transversely between and connect the principal top surface and the principal bottom surface which are substantially planar, parallel, and opposite one another;
the plate-like slider body defining at least one cord opening extending longitudinally therethrough and located between and parallel to at least one of the principal bottom surface and the principal top surface, each of the at least one cord opening being sized to receive the lanyard cord therethrough; and a first implement holder contiguous with and extending from the slider body, the first implement holder having a first holder sidewall and a second holder sidewall extending in opposed and spaced apart relation wherein the first holder sidewall and the second holder sidewall define therebetween a first elongated implement passageway aligned generally parallel to the at least one cord opening a second implement holder contiguous with the plate-like slider body, the second implement holder having a first holder sidewall and a second holder sidewall extending in opposed and spaced apart relation to one another, wherein the first holder sidewall and the second holder sidewall define therebetween a second elongated implement passageway generally parallel to the first implement holder and the at least one cord opening; and the first implement holder and the second implement holder being spaced apart from one another, such that at least a portion of the principal top surface extends between the second holder sidewall of the first implement holder and the first holder sidewall of the second implement holder.

17. The lanyard and lanyard slider combination of claim 16, wherein the lanyard cord defines a permanently closed loop.

18. The lanyard and lanyard slider combination of claim 16, wherein the plate-like slider body and the at least one implement holder define a monolithic, unitary member made of a resilient material;

the first holder sidewall and the second holder sidewall of the first elongated implement passageway are each capable of transitioning between a first contracted position and a second extended position;

the first holder sidewall and the second holder sidewall of the second elongated implement passageway are each capable of transitioning between a first contracted position and a second extended position; and the portion of the principal top surface extending between the second holder sidewall of the first implement holder and the first holder sidewall of the second implement holder is sized to simultaneously facilitate, without interference therebetween: (a) the transition of the second holder sidewall of the first implement holder between the first contracted position and the second extended position, and (b) the transition of the first holder sidewall of the second implement holder between the first contracted position and the second extended position.

19. The lanyard and lanyard slider combination of claim 16, further comprising:

a cap tether connected to the lanyard slider; and a cap connected to the cap tether, wherein the cap has a cap body that defines a blind cylindrical bore extending into the cap body.

* * * * *